United States Patent [19]
Tamura

[11] Patent Number: 5,596,681
[45] Date of Patent: Jan. 21, 1997

[54] METHOD OF DETERMINING AN OPTIMAL NUMBER OF NEURONS CONTAINED IN HIDDEN LAYERS OF A NEURAL NETWORK

[75] Inventor: Shinichi Tamura, Nagoya, Japan

[73] Assignee: Nippondenso Co., Ltd., Kariya, Japan

[21] Appl. No.: 326,950

[22] Filed: Oct. 21, 1994

[30] Foreign Application Priority Data

Oct. 22, 1993 [JP] Japan .................................. 5-287649
Feb. 21, 1994 [JP] Japan .................................. 6-022518

[51] Int. Cl.$^6$ ............................................. G06F 15/18
[52] U.S. Cl. .................................................... 395/23
[58] Field of Search ................................ 395/21, 23, 24

[56] References Cited

PUBLICATIONS

Sartori, M. A., "A Simple Method to Drive Bounds on the Size and to Trim Multilayer Neural Network", IEEE Trans on NN, v. 2, N. 4, 1991, pp. 467–471.
Weigend, A. S., "The effective Dimension of the Space of Hidden Units," IEEE 5th Int. Conf. on NN, Singapore, 1991, pp. 2069–2074.
Caponetto, R. et al, "Genetic Algorithms to select optimal neural Network Topology", 1992 CAS Midwest Symp., pp. 1381–1383.
Ewerbring, L., "Computing the Singular Value Decomposition on the Connection Machine," IEEE Trans. on Computers, v. 39, Iss. 1, 1990, pp. 152–155.
Reed:, "Prunning Algorithms– A Survey", IEEE Transactions on Neural Networks, vol.4, No.5, Sep.1993, pp. 740–747.
Lee, et al: "An NN Based Tone Classifier for Cantonese", Proceedings of 1993 International Joint Conference of Neural Networks, pp. 287–290.
Tamura et al: "Determination of The Number of Redundant Hidden Units in a Three–layered Feed–forward Neural Network", Proceedings of 1993 International Joint Conference on Neural Networks.
Hayashi:, "A Fast Algorithm for the Hidden Units in a Multilayer Perceptron", Proceedings of 1993 International Joint Conference on Neural Networks, pp. 339–342.
Waibel:, "Speech Recognitin Using Time–Delay Neural Networks", Snowbird Conference, 1988, pp. 106–110.
Lippmann: "An Introduction to Computing with Neural Nets", IEEE ASSP Magazine, Apr. 1987, pp. 4–23.
Rumelhart et al: "Parallel Distributed Processing" MIT Press 1986, vol. 1, pp. 322–327.

*Primary Examiner*—Robert W. Downs
*Assistant Examiner*—A. Katbab
*Attorney, Agent, or Firm*—Cushman Darby & Cushman IP Group of Pillsbury Madison & Sutro LLP

[57] ABSTRACT

An object of the present invention is to determine the optimal number of neurons in the hidden layers of a feed-forward neural network. The number of the neurons in the hidden layers corresponds to the number of the independent variables of a linear question and the minimum number of the variables required for solving a linear question can be obtained from the rank value in the matrix theory. Therefore, the rank value corresponds to the minimum number of the neurons required for the hidden layers. Accordingly, when the relation between the neural network constructed and trained is memorized in matrix and the rank value is obtained from this matrix, if the number of the neurons in use is larger than the rank value, as it means that redundant neurons exist which correspond to dependent variables, such redundant neurons can be eliminated. In many cases, due to errors in calculation, the diagonal elements of the matrix are not reduced to 0 and consequently the rank value can not be determined. By neglecting the diagonal elements that are smaller than the specific value e, however, the rank value can be estimated within the range of the error.

14 Claims, 7 Drawing Sheets

$o = s \left( \sum w_i o_i + \theta \right)$ $o = \sum w_i o_i + \theta$

METHOD OF DETERMINING AN OPTIMAL NUMBER OF NEURONS CONTAINED IN HIDDEN LAYERS OF A NEURAL NETWORK

CROSS REFERENCES TO RELATED APPLICATION

This application claims the benefit of priority of the prior Japanese patent applications No. 5-287649 and No. 6-22518 filed on Oct. 22, 1993 and Feb. 21, 1994 respectively, the contents of which are incorporated herein by reference.

BACKGROUND OF THE INVENTION

1. Field of the Invention

The present invention generally relates to a method of constructing a neural network. More particularly, the present invention relates to a method of determining the optimal number of neurons contained in hidden layers (also called "intermediate layers") of a feed-forward neural network.

2. Description of the Related Art

In the application of a feed-forward neural network (also called as "multi-layered neural network" and hereinafter referred to as "FFNN") to a specific question, conventionally the number of layers and the number of neurons in the hidden layers have been determined by researchers from their experiences and intuition. As shown in FIG. 9A, the FFNN, which is different from a recurrent type neural network shown in FIG. 9B, forms a one-way transmission network from an input layer to an output layer via at least one hidden layer. In the multi-layered FFNN, Back Propagation (BP) learning has been applied in general. BP learning is a learning algorithm which, when an output value with respect to the input value of a specific corollary or question is obtained, changes link weights (the coefficients of linkage) for linking each layer from the output layer side so that the desired output value with respect to the input value can be outputted for the corollary. According to the conventional method, an FFNN in which the multi-layered composition has provisionally been determined is trained through BP learning, and if the learning error value is smaller than a predetermined value, i.e., if the learning is successful, the FFNN is used for practical application. The employment of this method can be attributed to the fact that not only FFNN's but also general neural networks have never been theoretically analyzed to this date. As neural networks are not always of the optimum structure, sometimes several models of the neural network are prepared and trained and the best network for learning is used.

In any case, even if an, FFNN has been completely trained and is now suitable for practical application, there is no guarantee that this FFNN is optimum for the practical application and has the minimum number of the neurons in the hidden layers. Rather, an FFNN typically has extra neurons in the hidden layers. This means that more calculations than needed are performed, and this requires extra memory size. As a result, there is a problem that the network can handle only a limited range of questions and takes more time for calculation. Another problem is that if the network is formed in hardware, the hardware is dimensionally larger than the hardware needs to be. Accordingly, a method of constructing the optimum neural network has been sought.

SUMMARY OF THE INVENTION

Accordingly, it is an object of the present invention to provide a method of constructing a neural network which can set the optimum number of the neurons in the hidden layers in the neural network.

The inventor of the present invention took notice of the fact that after the FFNN had been trained, an expression of relation, which indicated the characteristics of the network, could be expressed in matrix, and found a method of optimizing the network by applying matrix and vector theories as the optimum method of constructing an FFNN.

The composition of the present invention will now be briefly described. In the method of constructing an neural network, particularly an FFNN having an input layer, an output layer and one or more hidden layers, according to the present invention, link weights of all the neurons at the input layer side are set through learning based on m pieces of learning data. Then, the rank value is obtained of the (m, n) matrix which can satisfy a linear expression of relation formed with the vector w which takes as elements the link weights $w_j$ of the j-th ($1 \leq j \leq n$) neuron among n ($n \geq 2$) neurons contained in the above hidden layers and the vector t which takes as elements the m learning values $t_i$ ($i=1, 2, \ldots, m$) of the above learning data. Then, the number of neurons in the above hidden layers based on the obtained rank value is taken as the optimum number of neurons.

If there are two or more hidden layers, it is advisable that the number of neurons should be optimized for each layer one by one in order from the above output layer side.

The number of neurons in the hidden layers corresponds to the number of independent variables of a linear question and the minimum number of independent variables necessary for solving a linear question can almost be obtained by the rank value in the matrix theory. Therefore, the rank value corresponds to the minimum number of the neurons necessary for the hidden layers. Accordingly, if the relation of a constructed and learned neural network is expressed in matrix, and if the number of neurons in use is larger than the obtained rank value, there are redundant neurons that correspond to dependent variables and therefore can be eliminated.

As a result, those networks that uselessly increase the volume of calculations can be reduced, and an efficient and optimum neural network can be constructed. Therefore, the time required for calculation and the capacity required for memory can be saved, and a computer of the same capacity can handle more advanced questions.

BRIEF DESCRIPTION OF THE DRAWINGS

Other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS

In the following passages, the present invention will be described based on preferred embodiments.

Figure 1:
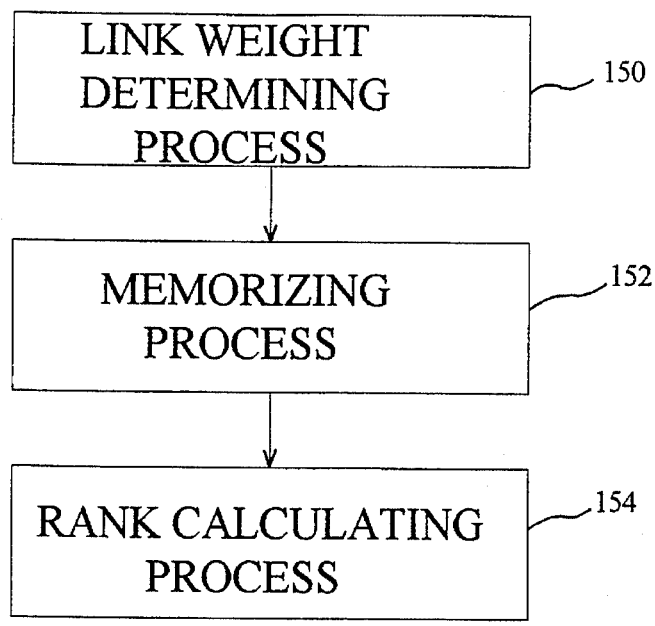
FIG. 1 is a flow chart of process blocks illustrating the procedure for determining the number of the neurons in the hidden layers in the first embodiment according to the present invention.
Figure 2:
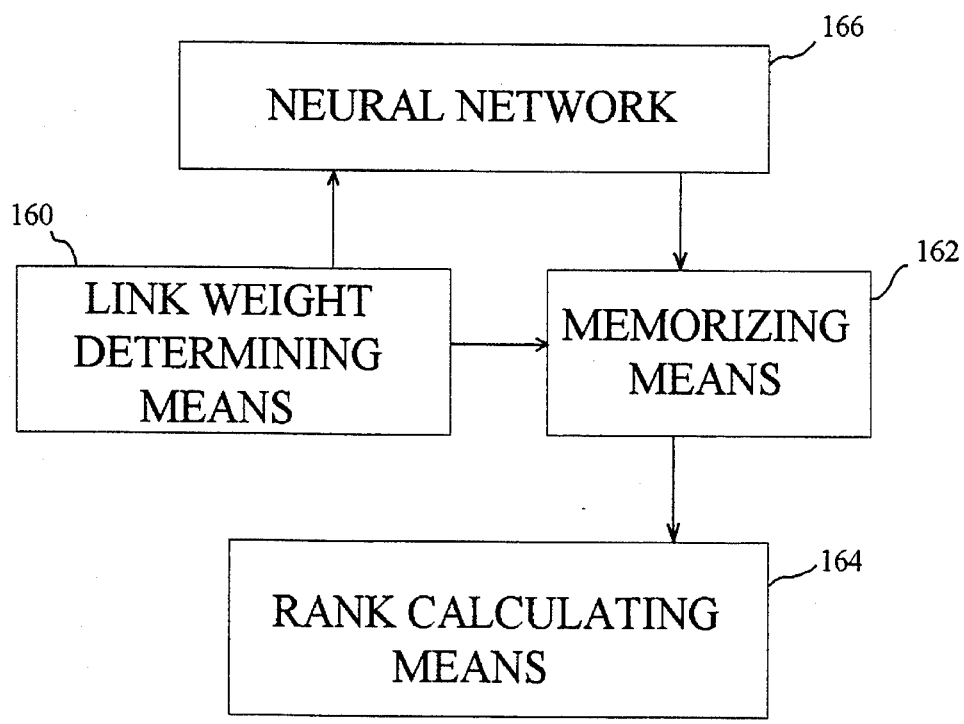
FIG. 2 is a block diagram of a construction device for use in the application of FIG. 1.

FIG. 1 is a flow diagram illustrating the procedure for determining the number of the neurons in the hidden layers, showing the first aspect of the present invention. FIG. 2 is a block diagram illustrating the composition of a device to be used in the above procedure.

Specifically, FIG. 2 illustrates a device for determining the number of the neurons in a neural network 166 which comprises an input layer into which input values are inputted, an output layer from which the output value is outputted, and hidden layers provided between the input layer and the output layer, where each of the neurons composing the input layer, the output layer and the hidden layers is linked to each other.

The above device comprises a link weight determining means 160 for determining link weights between each of the neurons by giving a plurality of teacher signals as learning data to the input layer, a memorizing means 162 for memorizing the relation between the teacher signals given by the link weight determining means 160 and the output values of the hidden layers with respect to the teacher signals, and a rank calculating means 164 for calculating the matrix rank memorized by the memorizing means 162, as the number of the neurons in the hidden layers.

A series of calculations are made by the above link weight determining means 160, memorizing means 162 and rank calculating means 164 to optimize the number of the neurons in the hidden layers. Specifically, as illustrated in FIG. 1, in the link weight determination process 150, a plurality of teacher signals are inputted as learning data into the input layer of a feed-forward neural network (FFNN), and link weights between each of the neurons are determined. In the memorizing process 152, each output value with respect to each teacher signal of each neuron in the hidden layers is memorized into the memory 162 as each element of a matrix based on the inputted teacher signals and the link weights determined in the link weight determination process 150. In the rank calculation process 154, the rank value of this matrix is calculated and the rank value is taken as the number of the neurons in the hidden layers.

Figure 3:
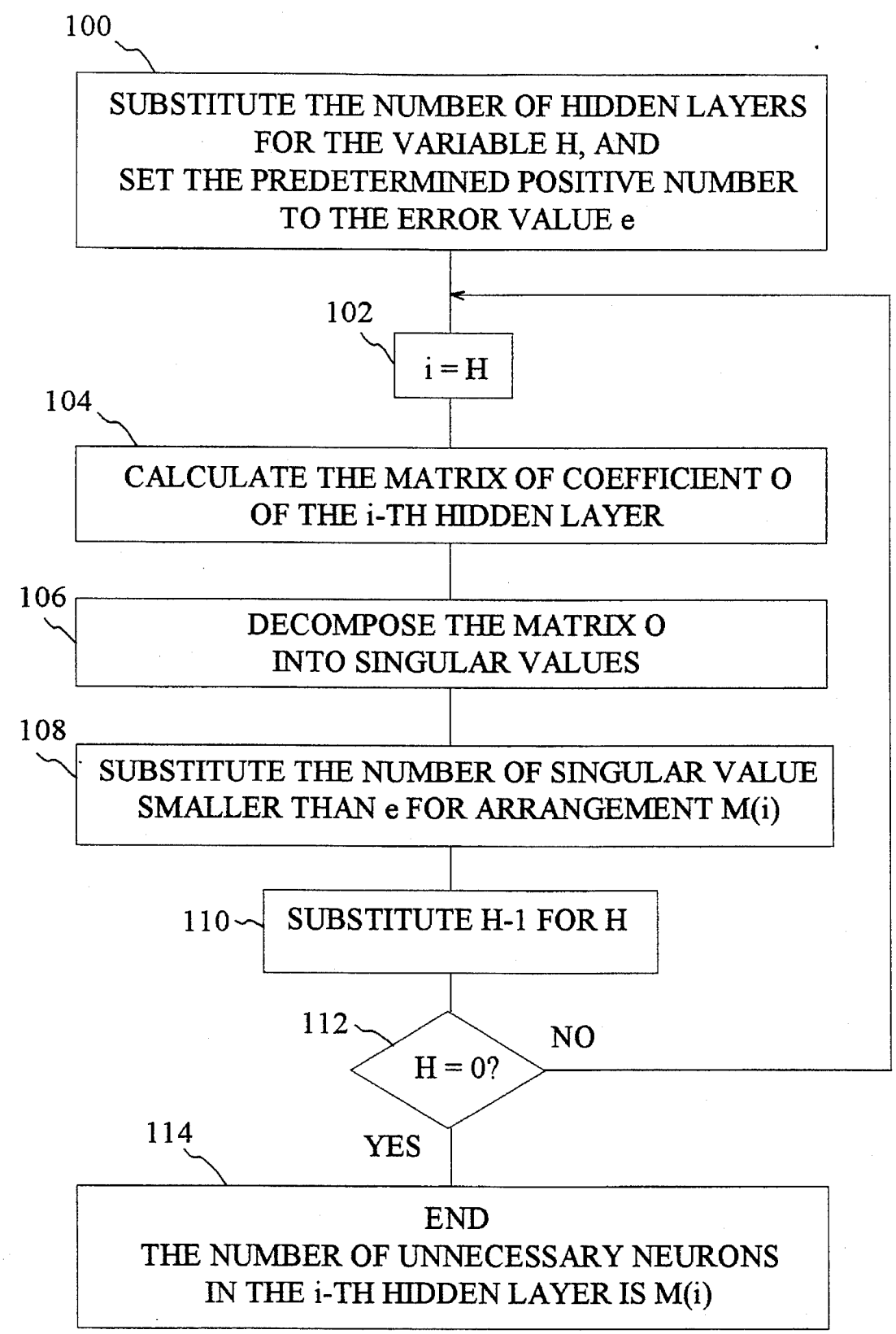
FIG. 3 is an example of flow chart illustrating a the procedure of the first embodiment for determining the number of the neurons in the hidden layers.

The above procedure will further be specifically described as follows:

FIG. 3 illustrates the procedure of this embodiment for determining the necessary number of the neurons in the hidden layers. The composition of an FFNN to which this procedure is applied is the four-layer neural network illustrated in FIG. 4.

Figure 4:
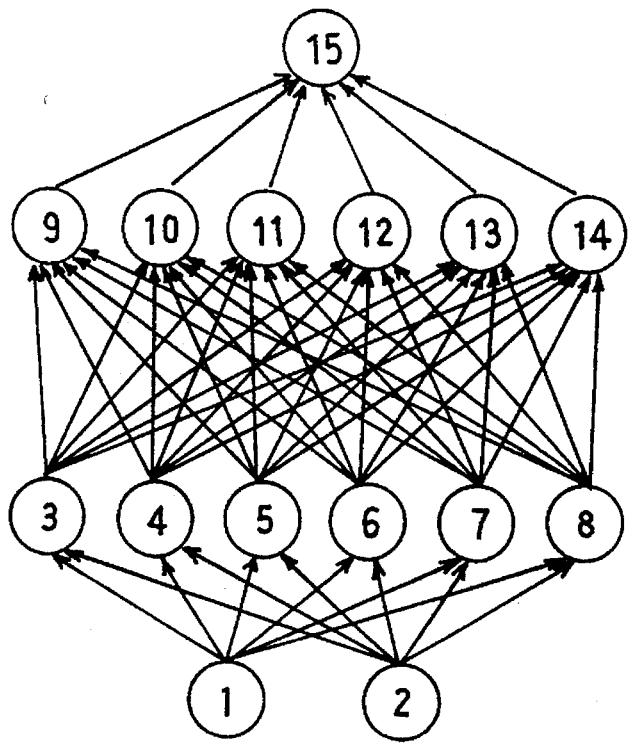
FIG. 4 is a composition model diagram illustrating a neural network for use in the construction of the neural network by using the flow chart of FIG. 3.

The FFNN illustrated in FIG. 4 consists of 2 neurons 1 and 2 in an input layer, 6 pieces of neurons 3 through 8 in the first hidden layer, 6 neurons 9 through 14 in the second hidden layer, and 1 neuron 15 in an output layer. Each neuron in each layer is linked to each neuron in the next layer. Each neuron has already been trained based on learning data and Back Propagation (BP) learning method, and each value of link weights has already been determined. Each neuron in the first and second hidden layers is supposed to have a sigmoid function of $s(x)=1/\{1+\exp(-x)\}$, as the transfer function, and each neuron in the input and output layers is supposed to have a linear function as the transfer function.

Figure 5A:
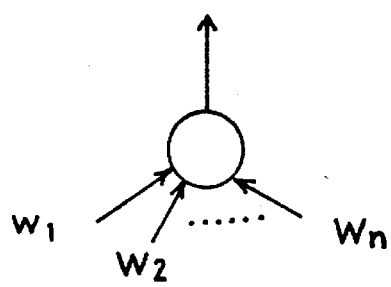
FIG. 5A is an illustrative diagram illustrating the functions of the neurons in the hidden layers.

That is, the relation between each neuron of n pieces of neurons in a hidden layer and the neuron in the next hidden layer at the output side is, as illustrated in FIG. 5A, calculated by multiplying each line value $o_j$ (j=1, 2, ..., n) from the hidden layer linked to the neurons in the hidden layer at the output side by $w_j$ (j=1, 2, ..., n) as link weight (weighing), which is given by the following equation:

$$o = s\left( \sum_{j=1}^{n} w_j o_j + \theta \right) \quad (1)$$

(s is a sigmoid function)

Figure 5B:
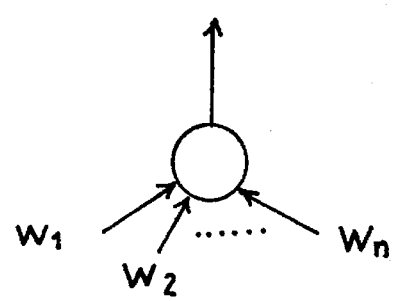
FIG. 5B is an illustrative diagram illustrating the functions of the neurons in the input and output layers.

This is the output value of the subject neuron. Here, $\theta$ is the potential or bias possessed by the subject neuron, which is expressed as a real number and can be determined according to the corollary. In each hidden layer illustrated in FIG. 4, there are 6 neurons (n=6) of this type combined in a row. The relation between the neurons in the input layer and the neuron in the output layer is in a linear relation as illustrated in FIG. 5B.

Now, it is supposed that the FFNN has been trained based on 10 learning data output values (teacher signals) $t_i$ (i=1, 2, ..., 10). First of all, in the second hidden layer near the output layer, when the j-th (j=1, 2, ..., 6) output of a neuron in the second hidden layer when the i-th learning data is given is o(i, k) (k=j+8), the following 10×6 matrix O is formed:

$$O = \begin{bmatrix} o(1,9), o(1,10), \ldots, o(1,14) \\ o(2,9), o(2,10), \ldots, o(2,14) \\ \ldots \\ o(10,9), o(10,10), \ldots, o(10,14) \end{bmatrix} \quad (2)$$

(where, i=1, 2, ..., 10, k=9, 10, ..., 14 (6 neurons))

This matrix O satisfies the following linear equation, Equation (3), within the learning error range of this FFNN with the column vector W composed of the link weight ($w_1$, $w_2$, ..., $w_6$) of each line linked from the 6 neurons 9 through 14 in the second hidden layer to the neuron 15 in the output layer and the learning data vector t.

$$OW = t \quad (3)$$

where, the learning data vector t is supposed to take the learning data output values (teacher signals) $t_i$ (i=1, 2, ..., 10) as elements. In the vector W, the element $w_j$ (j=1, 2, ..., 6) denotes the link weight from the neuron No. (j+8) in the second hidden layer to the neuron 15 in the output layer. When there are 20 pieces of learning data, for example, the number of expressions of relation increases as many as the number of the learning data. As each learning data normally contains a non-linear relation, it is preferable that many learning data widely distributed within the available data range should be utilized, or if possible, all the learning data should be utilized.

When this matrix O has been fixed, then the rank value R of this matrix O should be obtained. From the mathematical linear algebraic theory, it has been known that random m×n matrix M can be expressed by the following equation from 2 orthogonal matrices, m×m orthogonal matrix X and n×n orthogonal matrix Y, and 1 m×n diagonal matrix G:

$$M = XGY^t \quad (4)$$

(Superscript t denotes the transposition of the matrix Y.)

Therefore, the matrix O of Equation (2) can be expressed by the following equation:

$$O = UDV^t \quad (5)$$

(Superscript t denotes the transposition of the matrix V.)

$$D_{iag} = (\sigma_1, \sigma_2, \sigma_3, \ldots, \sigma_r) \quad (6)$$

($r = \min(m, n)$, $\sigma_i \geq 0$ ($1 \leq i \leq r$))

The diagonal component $D_{iag}$ of the diagonal matrix D in Equation (6) is called "singular value," where the components can be sorted in descending order, i.e., $\sigma_1 \geq \sigma_2 \geq \sigma_3 \geq \ldots, \geq \sigma_r \geq 0$ (in accordance with the linear algebraic theory that the relation remains unchanged even if the row or column of a matrix is interchanged). A series of the expansion and reconstruction of a matrix is called "singular value decomposition."

It has also been known from the linear algebraic theory that the number of the diagonal components of the diagonal matrix G which is not 0 indicates the rank of the original matrix M.

Furthermore, it has also been known that the matrix M' obtained from the matrix G' that has made q diagonal components taken in order from the smallest in singular value among of all the diagonal components of the diagonal matrix G zero is a matrix which has the shortest least square distance among of all the matrices the rank of which is smaller than that of the matrix M by q. This means that the matrix M' provides a very good approximation of the original matrix M. That is, it is possible that by approximating the matrix M by the matrix M' with smaller rank, the rank of the matrix M can be lowered and the number of neurons can further been reduced. In mathematics, $\sigma_i$ in Equation (6) can be exactly 0. From the results of the learning in the neural network, however, as learning errors are included due to the network characteristics, $\sigma_i$ in Equation (6) might not accurately be 0. Nevertheless, as those components which are small in $\sigma_i$ are below the specific error value e, it is reasonable to regard such components as 0 in terms of approximation.

To disregard the diagonal components under the specific error value e and set these components to zero has been identified as an approximate matrix with the smallest sum total of square value (square distance) of errors in linear algebraic theory. That is, when there are p components which are not 0 among of all $\sigma_i$, the rank R of the matrix O is p. Therefore, the number of the neurons in the second hidden layer can be set to p. On the other hand, when q singular values $D_{iag}$ can be regarded as 0, the matrix O' obtained by the diagonal matrix D' is a matrix which is the smallest in square distance, i.e., the most approximate, among of all the matrices the rank of which is smaller than that of the matrix O by q. This means that the linear expression of relation that provides the best approximation can be obtained and the approximation can be practiced while the calculation error in the FFNN remains small. In short, q neurons can further be made unnecessary, and the network can further be made more efficient.

Therefore, the rank of the matrix O in Equation (1) obtained through learning can be the number of the components left after the error value e or less is treated as 0 in each diagonal component $\sigma_i$, i.e. (p−q). Accordingly, as the rank value R means the independent number of elements according to the linear algebra, the obtained rank value R (R=p−q) provides the independence of neurons, i.e., the minimum number of the minimum required neurons.

When the rank value R agrees with the number of neurons, N, it means that all the neurons are independent and necessary in a neural network and therefore can not be eliminated. If any more neurons are omitted, errors in learning increase.

When the rank value R is smaller than the number of neurons, N, (N−R) neurons can be eliminated. That is, neurons from the second hidden layer can be eliminated without significantly increasing learning errors (more precisely, without increasing the minimum square errors or the sum total of the singular values is equal to or smaller than the error value e).

For example, when the rank R is 5, if the vector $o_1$ can be expressed by other vector $o_i$ (i=2, 3, ..., 6) among of the neurons 9 through 14 in the second hidden layer illustrated in FIG. 4, Equation (3) can be expressed as $$(\Sigma k o_i, o_2, o_3, o_4, o_5, o_6)W = t \quad (7)$$

(i=2, 3, ..., 6)

As this expansion is a mere expression of Equation (3) by the vector $\sigma_i$ (i=2, 3 ..., 6), the number of neurons can be 5, fewer by 1. When the rank value R is smaller, by repetitively applying the above expansion, it is understood that as many as (N−R) neurons are made unnecessary.

Now, attention will be directed to the first hidden layer. In the same way as used for the second hidden layer, the matrix O is formed with a proper number of rows and columns. In this case, the matrix W of link weights composes column vectors which arrange the link weights of the value linked from the first hidden layer to the j-th neuron in the second hidden layer. Here, as there are 6 neurons in the second hidden layer which corresponds to be an output layer of the first hidden layer, 6 sets of Equations (3) can be obtained, and the next task is to obtain the matrix O that satisfies all 6 sets of Equations (3). The value corresponding to the learning vector t is given with the learning value 15. When each link weight of the neurons in the second hidden layer is fixed through learning, the output values from the first hidden layer are regulated from the second hidden layer side. Therefore, these regulated output values are used. From these equations, by applying the method described above and illustrated in FIG. 3 in the same way, the rank value R obtained there is the number of the minimum required neurons in the first hidden layer, and therefore the number of unnecessary neurons can be determined. Not only in this embodiment but also in FFNN's having multi-layered structures, the number of the neurons in each hidden layer can be determined one by one from the output side in the same way.

That is, when there are l ($l \geq 2$) hidden layers, the rank value $R_l$ is obtained with respect to the l-th hidden layer formed immediately before the output layer. The rank value $R_l$ is supposed to be the number of the neurons in the l-th hidden layer, and then, the rank value $R_{l-1}$ is successively obtained from the matrix O that satisfies a linear expression of relation (Equation (8)) as to the j-th neuron (j=1, 2, ..., $R_l$) in the l-th hidden layer with respect to the (l−1)th hidden layer.

$$Ow^{(j)} = t^{(j)} \quad (8)$$

(where, $w^{(j)}$ is the link weight from each neuron in the (l-1)th hidden layer to the j-th neuron, and $t^{(j)}$ is the output of the j-th neuron with respect to the learning value $t_i$ in Equation (3))

Then, as the number of the neurons in the (l-1)th hidden layer, the number of the optimum neurons in each hidden layer is determined.

Now, the procedure for practicing the present invention will be described referring to the flow chart illustrated in FIG. 3. In Step 100, as the initial setting, the above error value e is preset to a specific vale such as 0.1, and all the diagonal elements smaller than this preset value e are set to be discarded not to be include in the rank. In Step 102, the number of hidden layers, H, is set to the calculation parameter i. In Step 104, as the link weights prelearned based on the teacher data has been obtained. From this obtained learning result data, the coefficient matrix O in the i-th hidden layer is calculated. Then, in Step 106, the obtained coefficient matrix O is decomposed into singular values. In Step 108, from the obtained singular values, the number of the singular values smaller than the error value e are substituted for the arrangement M(i). Next, in Steps 110 and 112, process proceeds to the hidden layer in the next stage, the above steps are repeated for the rest of all the hidden layers. In Step 114, in the arrangement M(i) finally obtained is indicated the number of unnecessary neurons. Although the number of unnecessary neurons is calculated in this procedure, it is the same in meaning that the rank value, i.e., the number of necessary neurons, is outputted.

As another embodiment according to the present invention, a method for constructing a neural network includes repeating several times the determination of the optimum number of neurons. In the construction of a learned neural network, the number of the optimum neurons is determined by calculating the rank value. Then, the neural network for which the optimum number of neurons has been set is relearned, and the rank is calculated again based on the obtained new link weight and a procedure for determining the optimum number of neurons is repeated.

Figure 6A:
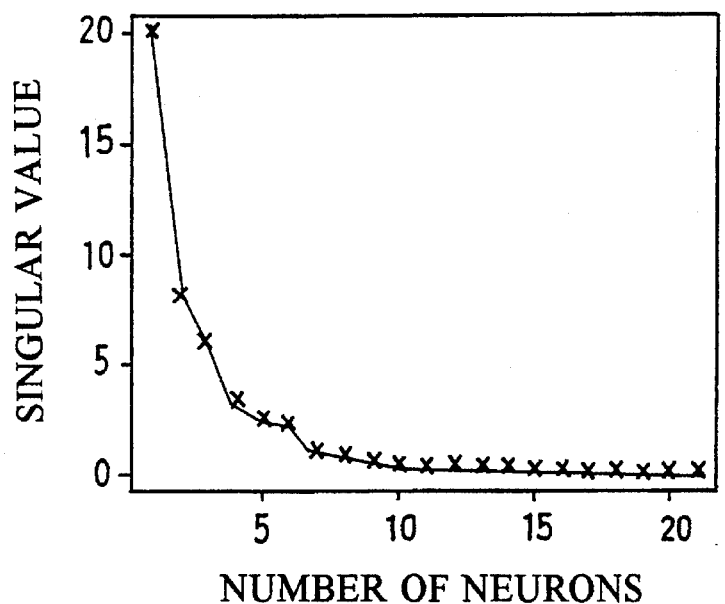
FIGS. 6A and 6B are characteristic graphs illustrating the simulation results of the singular values.
Figure 6B:
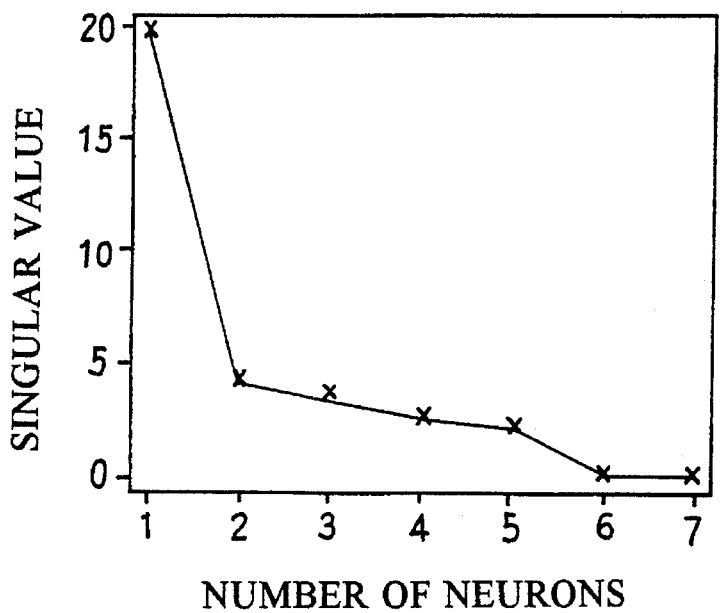

FIG. 6A illustrates the results of simulation to obtain singular values by decomposing the link weights into singular values based on 100 pieces of learned data in a case where an FFNN of three-layer construction (2 neurons in an input layers, 20 neurons in hidden layers and 1 neuron in an output layer) (not illustrated) is applied to a question of square area detection. From this figure, the number of neurons which are supposed to be unnecessary is, as the number of neurons considerably decreased at the 5th and 6th neurons, about 14 neurons, and the number of neurons which mainly act is 6 or 7 neurons. Accordingly, in an FFNN in which the number of the neurons in the hidden layer is reduced to 7, when a training is made based on the same learned data and singular values are obtained again, the results are as illustrated in a graph of FIG. 6B. From the results illustrated in FIG. 6B, another 2 neurons are supposed to be unnecessary, and the number of the neurons in this hidden layer can be reduced to 5. It has been known that in this applied questions, the number of neurons may be 4 (R. P. Lippman et al., "An Introduction to Computing with Neural Nets," IEEE ASSP Magazine, pp. 4–23, Apr. 1987), and the construction method according to the present invention proves to be able to sufficiently satisfy the requirement.

Incidentally, which neuron is independent or dependent is determined as a result of learning and can not be determined before the learning. From this fact, a more precise neural network is constructed by empirically training a neural network based on the number of the neurons in a proper hidden layer, obtaining a rank from the linear expression of relation of the learning data at the input side and output side obtained by the previous step, eliminating the number of unnecessary neurons, and then a new link weight is obtained by training the neural network again. Alternatively, a procedure for obtaining the optimum network that those neurons which are small in singular value are eliminated, relearning is made while the remaining link weights are followed, and the convergence of BP learning is accelerated may be used.

As described above, in the learned FFNN, irrespective of the number of the neurons composing each layer, the optimum number of the neurons in the hidden layer can be determined based on the learning data, efficient calculation can be made, and an FFNN which can obtain effective results can be constructed.

As the third embodiment according to the present invention in contrast to the above first and second embodiments, for the construction of an efficient FFNN, a method of determining which neuron should be eliminated and which neuron should be left among all the neurons currently existing in hidden layers will be described referring to the four-layer FFNN.

As the procedure for the first hidden layer is the same as that for the second hidden layer, description will be given of a method for determining the number of unnecessary neurons in the second hidden layer. The method of this embodiment comprises the first process for forming the column vectors of neurons in the hidden layer, the second process for determining the number of neurons which can be eliminated among of all the neurons currently existing in the hidden layer, and the third process for redetermining the link weight of each neuron left in the second process. In the following passages, these processes will be described one by one in this order.

It should be noted that the first process comprises a matrix forming process for training the FFNN based on a plurality of learning data and forming the matrix O based on the FFNN obtained through the learning, and a column vector forming process for decomposing the matrix formed in the above matrix forming process into column vectors according to individual neurons in the above hidden layer.

The second process comprises a column vector selecting process for obtaining as many column vectors which are high in the linear independence as the number of the ranks of the matrix O among of all the individual column vectors formed in the column vector forming process, and a neuron eliminating process for leaving neurons in the hidden layer which correspond to the column vectors which are high in the linear independence obtained in the column vector forming process and eliminating the other neurons from the hidden layer.

The third process comprises a link weight determining process for determining the new link weight of an FFNN having the hidden layers composed of the neurons left in the neuron eliminating process.

Now, the first process will be described.

Here, it is supposed that this FFNN has been trained based on 10 leaning data output values (teacher signals) $t_i$ (i=1, 2, ..., 10) (m=10) and that the number of neurons which can be eliminated, M, has been obtained by the procedure described in the above first and second embodiments.

Firstly, as described in the description of the above first embodiment, in the second hidden layer from the output layer, when the output of the j-th neuron when the i-th learning data is given is o(i, k), the 10×6 matrix O is formed as expressed by Equation (2) (matrix forming process).

Specifically, the output of individual neurons in the hidden layer with respect to each learning data $t_i$ of a plurality (m pieces) of learning data is expressed as a column vector, and the (m, n) matrix O (m is the number of learning data, and n is the number of the neurons in the hidden layer) which arranges as many column vectors as the number of learning data is formed (Equation (9)).

$$O = \begin{bmatrix} o(1,1), o(1,2), \ldots, o(1,6) \\ o(2,1), o(2,2), \ldots, o(2,6) \\ \ldots \\ o(10,1), o(10,2), \ldots, o(10,6) \end{bmatrix} \quad (9)$$

(wherein, i=1, 2, ..., 10 (10 items) are the learning data, k=1, 2, ..., 6 (6 items) correspond to neurons 9, 10, ..., 14 respectively in FIG. 4.)

Here, Equation (9) can be decomposed as the following equation by using $o_j$ (a 10×1 column vector (j=1, 2, ..., 6)) (vector forming process).

$$O = (o_1, o_2, o_3, o_4, o_5, o_6) \quad (10)$$

Then, $o_j$ in Equation (10) is expressed as follows:

$$o_j = \begin{bmatrix} o(1,j) \\ o(2,j) \\ \ldots \\ o(10,j) \end{bmatrix} \quad (11)$$

Therefore, the point is which column vectors of (6–M) (M is the number of neurons to be eliminated from the second hidden layer) should be selected from all the column vectors $o_1, \ldots, o_6$ and left in the second hidden layer. As (6–M) is the number of the linear independent vectors of $o_1, \ldots, o_6$, it is preferable that (6–M) column vectors which are high in the linear independence should be selected. As the remaining M column vectors are expressed by the linear combination of (6–M) column vectors, the base vectors to be left should preferably be high in the linear independence in order to restraint the increase in calculation error or the extreme fluctuation in the coefficient of combination of the linear combination of column vectors. Therefore, in this case, from 6 neurons in the hidden layer, (6–M) neurons which are high in the linear independence of the column vectors against the neurons should be selected.

Figure 7:
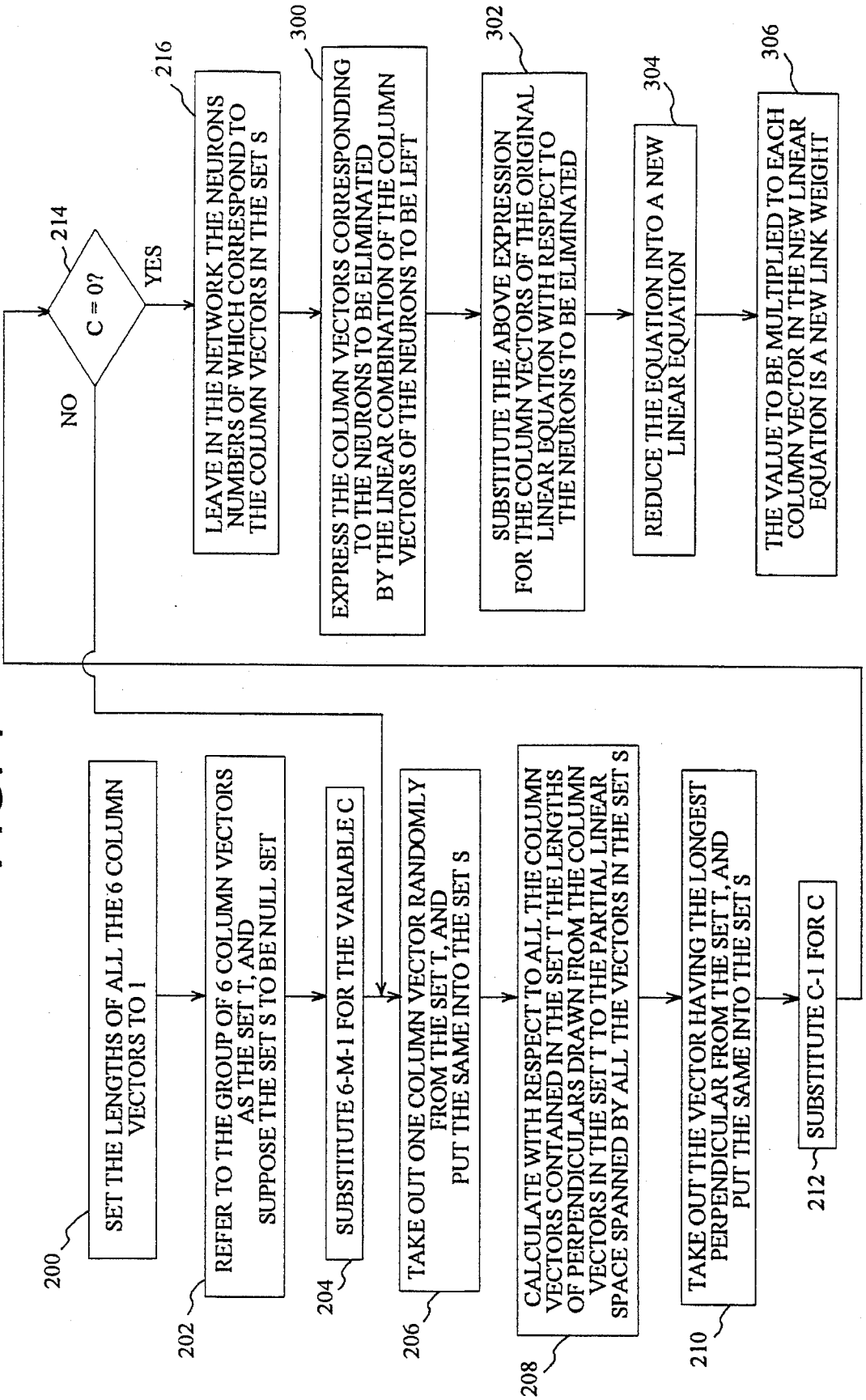
FIG. 7 is a flow chart of the third embodiment according to the present invention illustrating a method of constructing an FFNN.

Now, based on the flow chart illustrated in FIG. 7, the second process (column vector selecting process) will be described.

Figure 8:
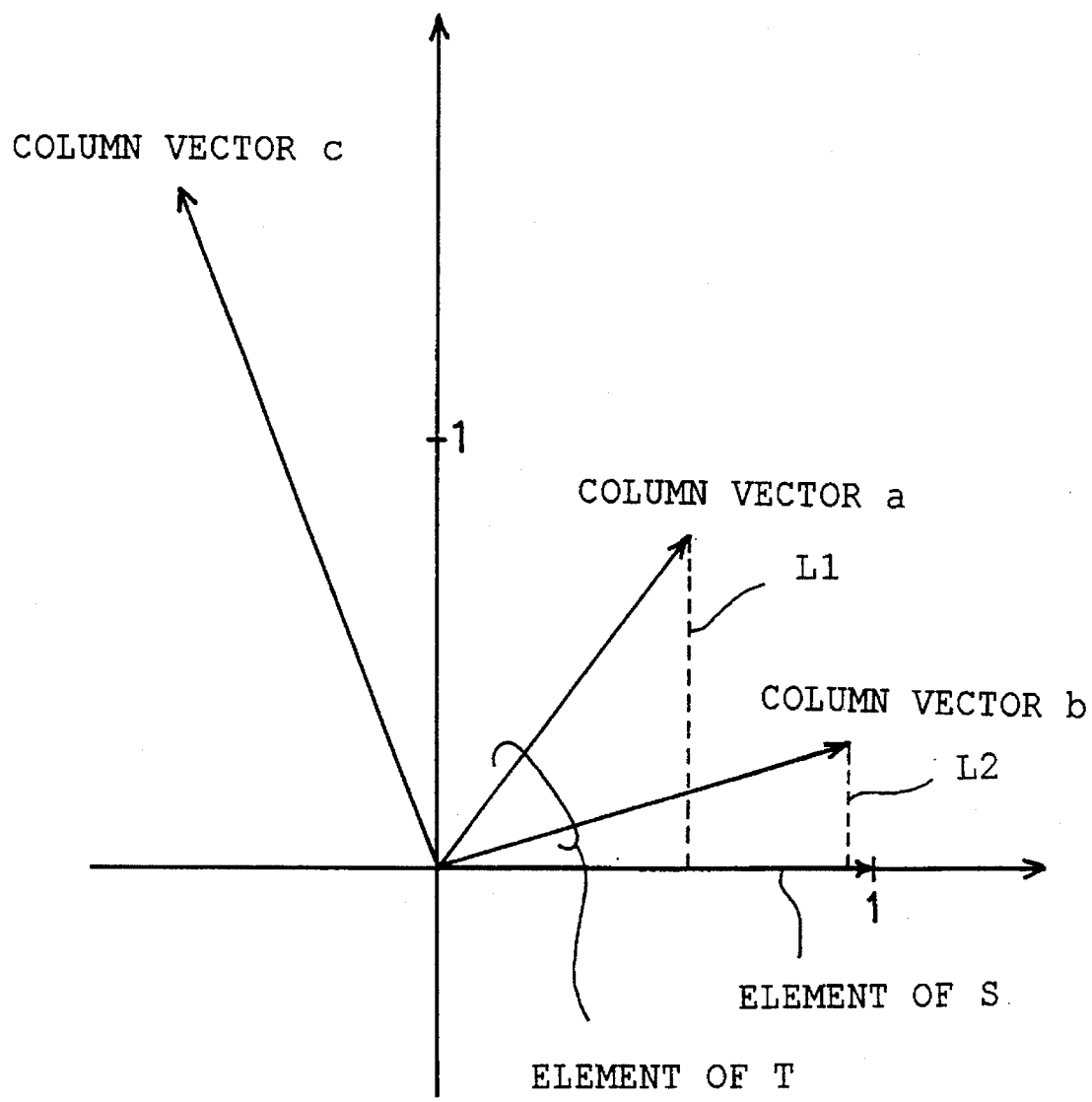
FIG. 8 is an illustrative diagram illustrating the selection of column vectors in the flow chart of FIG. 7.
Figure 9A:
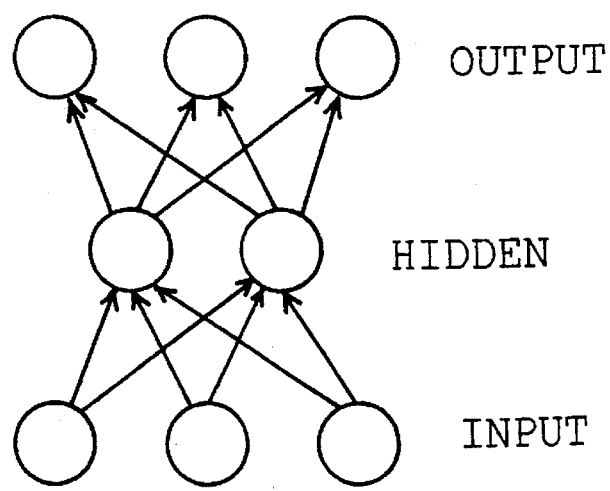
FIGS. 9A and 9B are model composition diagrams of a general neural network.
Figure 9B:
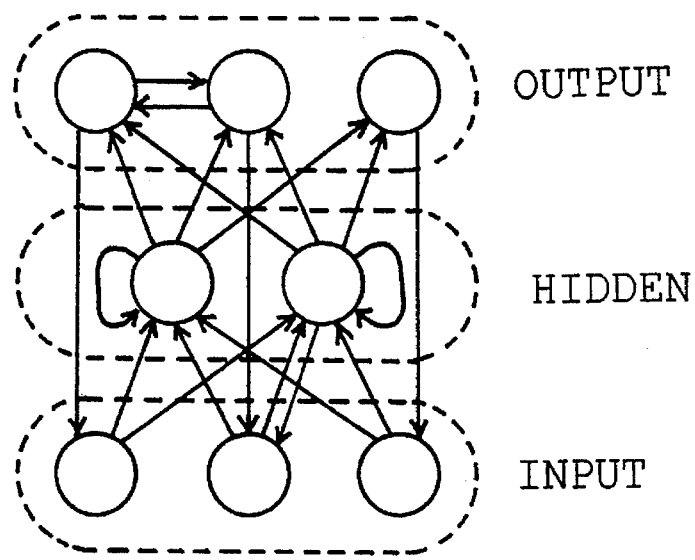

In Step 200, all the lengths of 6 10×1 column vector are set to 1 (normalization stage). In Step 202, the set T which is a group of 6 column vectors and the null set S are considered (set forming stage). In Step 204, the number which is smaller by 1 than the number (6–M) of neurons to be left is considered and substituted for the variable C which is a counter. Then, in Step 206, an arbitrary column vector is taken out from the set T and put into the set S (column vector transferring stage). In Step 208, as illustrated in FIG. 8, the lengths of perpendiculars drawn from the column vectors in the set T to a partial linear space spanned by the column vectors in the set S, i.e., the strength of linear independence, are calculated for all the column vectors contained in the set T (perpendicular calculating stage). In Step 210, the longest perpendiculars of all the perpendiculars calculated in Step 208, i.e., the perpendicular that is the highest in linear independence, is taken out from the set T and put into the set S (extracting stage).

Here, the meaning of Steps 208 and 210 will be described referring to FIG. 8. The lengths of the perpendiculars drawn from the column vectors in the set T to partial linear space spanned by the column vectors in set S correspond to L1 or L2 in FIG. 8. There are 2 column vectors a and b. It is supposed that by using either of these columns a and b and the 2 column vectors of the elements of the set S, the expression of an unspecified column vector c is tried. In this case, the column vector c is expressed by the total of the scalar product of the column vector b and the scalar product of the element of the set S. However, expressing by using the column vector a and the element of the set S is smaller in scalar quantity than expressing by using the column vector s and the element of the set S. That is, it is efficient to adopt the network with longer perpendiculars. As the lengths of the perpendiculars are compared in this way, it is necessary to set all the column vector lengths to 1 in Step 200.

In Step 212, (C–1) is substituted for C, and the process returns to Step 206. Then, until C=0 is achieved, this procedure is repeated. When C=0 has been achieved, that is, when the procedure has been repeated for (6–M) times which is the number of the ranks of the matrix O, the number of the neuron corresponding to the column vector that remained to the last in the set T is identified in Step 216. This neuron is eliminated from the network, and the neuron corresponding to the column vector transferred into the set S is left in the network (neuron eliminating process). This means that the column vectors which are high in the linear independence remain in the set S.

Next, the third process (link weight determining process) will be described.

In the network, when the neurons which were judged to preferably be eliminated has been eliminated, the vacancy caused by the elimination of the neurons should be filled. For this purpose, the column vectors with respect to the neurons which have been determined to be eliminated are expressed by the linear combination of the column vectors to be left, and substituted for the original linear equation. When this linear equation is reduced, a linear equation composed only of the column vectors to be left is obtained. The coefficients multiplied to the respective column vectors of this new linear equation are new link weights from the neurons to the neurons in the next hidden layer.

In short, when the vector composed of $w_j$ in Equation (1) is W and the vector composed of the learning data output value is t, like Equation (3), the learning results can be expressed by the following equation:

$$OW = t \quad (12)$$

Here, in Equation (10), 1 piece of column vector $o_1$, for example, is supposed to be expressed by a linear combination as follows:

$$o_1 = a_2 o_2 + a_3 o_3 + a_4 o_4 + a_5 o_5 + a_6 o_6 \quad (13)$$

When Equation (13) is substituted for Equation (12), the following equation can be obtained:

$$(a_2 o_2 + a_3 o_3 + a_4 o_4 + a_5 o_5 + a_6 o_6, o_2, o_3, o_4, o_5, o_6)W = t \quad (14)$$

When this equation is expanded, the following equation can be obtained:

$$(w_1 a_2 + w_2) o_2 + (w_1 a_3 + w_3) o_3 + (w_1 a_4 + w_4) o_4 + (w_1 a_5 + w_5) o_5 + (w_1 a_6 + w_6) o_6 = t \quad (15)$$

This means that the matrix composed of 5 pieces of column vectors $$(o_2, o_3, o_4, o_5, o_6) \quad (16)$$

satisfies Equation (12). That is, the new values multiplied to $o_j$ (j=2, ..., 6) in Equation (15) are new link weights.

Then, based on a flow chart illustrated in FIG. 7, the third process will be described.

Firstly, in Step 300, the column vectors corresponding to the neurons eliminated in Step 216 are expressed by the linear combination of the column vectors of the neurons to be left. In Step 302, the column vectors expressed by the above linear combination are substituted for the original linear equation. In Step 304, this linear equation is reduced with respect to each column vector. Finally, in Step 306, the numerical values multiplied to the respective column vectors in the above reduced linear equation are determined to be new link weights.

The above procedure can also be applied to the first hidden layer in the same way as the second hidden layer.

As described above, in the trained FFNN, the present invention can determine which neurons in a hidden layer should be left and which neurons in the hidden layer should be eliminated based on the learning data irrespective of the number of neurons composing the hidden layer. Therefore, an FFNN which allows efficient calculation and effective results can be constructed. Furthermore, those networks which uselessly increase the amount of calculations can be reduced, whereby an efficient optimum neural network can be constructed. As a result, calculation time and memory size can be saved, and a computer with this network can treat more advanced questions compared with the other computers of the same capacities.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method of constructing a neural network comprising an input layer having at least one neuron into which input values are inputted, an output layer having at least one neuron from which an output value is outputted, and at least one hidden layer having at least one neuron provided between said input layer and said output layer, each neuron in each layer being linked to every neuron of a next layer from said input layer to said output layer, said method determining the number of said neurons in said hidden layer;

said method comprising:

a link weight determining process including inputting a plurality of teacher signals as learning data into said input layer and determining link weights between each pair of linked neurons;

a memorizing process including memorizing the relation between said teacher signals inputted in said link weight determining process and the output values of each neuron in said hidden layer determined by the link weights determined in said link weight determining process with respect to said teacher signals as a matrix into a memory; and a calculating process including calculating a rank value of the matrix memorized in said memory and taking said rank value as the number of the neurons in said hidden layer.

2. The method of constructing a neural network according to claim 1, wherein:

said neural network is provided with a plurality of hidden layers; and said memorizing process and said rank calculating process are practiced with respect to said hidden layers and the number of the neurons in said hidden layers is obtained one hidden layer at a time from a hidden layer nearest said output layer toward said input layer.

3. A method of constructing a neural network comprising an input layer having at least one neuron into which input values are inputted, an output layer having at least one neuron from which an output value is outputted, and at least one hidden layer having at least one neuron provided between said input layer and said output layer, each neuron in each layer being linked to every neuron of a next layer from said input layer to said output layer, said method determining the number of said neurons in said hidden layer;

said method comprising:

a first link weight determining process including inputting a plurality of teacher signals as learning data into said input layer and determining link weights between each pair of linked neurons;

a memorizing process including memorizing the relation between said teacher signals inputted in said link weight determining process and the output values of each neuron in said hidden layer determined by the link weights determined in said link weight determining process with respect to said teacher signals as a matrix into a memory; and a calculating process including calculating the rank value of the matrix memorized in said memory and taking said rank value as the number of the neurons in said hidden layer, said calculating process comprising a column vector forming process including
decomposing said matrix memorized in said memorizing process into as many column vectors as the number of neurons in said hidden layer, a column vector selecting process including obtaining as many column vectors which are high in linear independence as the number corresponding to the value of said rank between said column vectors formed in said column vector forming process, a neuron eliminating process including leaving the neurons in said hidden layer corresponding to said column vectors which are high in linear independence obtained in said column vector selecting process and eliminating the other neurons from said hidden layer, and a second link weight determining process including determining new link weights of a feed-forward neural network having said hidden layer composed of the neurons left in said neuron eliminating process.

4. The method of constructing a neural network according to claim 1, wherein said memorizing process comprises:

expressing each output of the neurons in said hidden layer with respect to each teacher signal of said learning data as a column vector; and forming a matrix (m×n matrix, where m is the number of learning data and n is the number of the neurons in said hidden layer) by arranging as many of said column vectors as the number of said learning data.

5. The method of constructing a neural network according to claim 3, wherein said column vector forming process decomposes said matrix into n column vectors (m×1 column vector) which is the number of the neurons in said hidden layer.

6. The method of constructing a neural network according to claim 3, where said column vector selecting process comprises:
- a normalizing process including setting the lengths of said n column vectors to 1;
- a set forming process including forming first set composed of said n column vectors and a second set composed of null sets;
- a column vector transferring process including taking out 1 arbitrary column vector from said first set and putting the same into said second set;
- a perpendicular calculating process including obtaining the lengths of perpendiculars drawn from said column vectors in said first set to a partial linear space spanned by said column vectors in said second set; and
- an extracting process including taking out said column vector having the longest perpendicular from all said perpendiculars and putting the same into said second set, wherein said column vector selecting process repeats said column vector transferring process, said perpendicular calculating process and said extracting process as many times as the number corresponding to said rank value, and the neurons in said hidden layer corresponding to the column vectors left in said first set are eliminated from said hidden layer.

7. The method of constructing a neural network according to claim 3, wherein said second link weight determining process comprises:
- expressing the column vectors corresponding to the neurons in said hidden layer eliminated in said neuron eliminating process by a linear combination of the column vectors of the neurons left in said hidden layer and substituting the same for a predetermined linear equation expressing said relation;
- reducing said linear equation with respect to the column vectors; and
- determining the coefficients multiplied to respective column vectors of said reduced linear equation as new link weights.

8. The method of constructing a neural network according to claim 3, wherein the neurons in said hidden layer have sigmoid function $$s(x)=1/(1+\exp(-x)).$$

9. The method of constructing a neural network according to claim 3, wherein each of the neurons in said each hidden layer multiplies the value outputted from either the neurons in said hidden layer in the previous layer from which said each neuron is linked or from the neurons in said input layer to said link weights and adds the product, then further adds the bias dependent on each neuron in said hidden layer to the sum of the previous addition, then inputs the sum of the bias and the previous addition into said sigmoid function, and finally takes the calculated results as an output value to the next layer.

10. A device for constructing a neural network comprising an input layer having at least one neuron into which input values are inputted, an output layer having at least one neuron from which an output value is outputted, and at least one hidden layer provided between said input layer and said output layer, each neuron in each layer being linked to every neuron of a next layer from said input layer to said output layer, said device determining the number of said neurons in said hidden layer;

said device comprising:
- link weight determining means for inputting a plurality of teacher signals as learning data into said input layer and determining link weights between each pair of linked neurons;
- memorizing means for memorizing the relation between said teacher signals inputted in said link weight determining means and the output values of each neuron in said hidden layer determined by the link weights determined in said link weight determining means with respect to said teacher signals as a matrix into a memory; and
- calculating means for calculating a rank value of the matrix memorized in said memory and taking said rank value as the number of the neurons in said hidden layer.

11. A method of constructing a neural network comprising an input layer having at least one neuron into which input values are inputted, an output layer having at least one neuron from which an output value is outputted, and at least one hidden layer having at least one neuron provided between said input layer and said output layer, each neuron in each layer being linked to every neuron of a next layer from said input layer to said output layer, said method determining the number of said neurons in said hidden layer;

said method comprising:
- a link weight determining process including inputting a plurality of teacher signals as learning data into said input layer and determining link weights between said each neuron;
- a rank calculating process including calculating a rank value of a matrix O expressed by the following linear equation:

$$O \times w = t$$

wherein w stands for a column vector of said link weights and t stands for a column vector of said teacher signals, and taking said rank value as the number of the neurons in said hidden layer.

12. The method of constructing a neural network according to claim 11, wherein said neural network is provided with a plurality of hidden layers and said rank calculating process is executed from said hidden layer nearest said output layer to said hidden layer nearest said input layer.

13. The method of constructing a neural network according to claim 11, wherein said rank calculating process comprises:
- expressing each output of the neurons in said hidden layer with respect to each teacher signal of said learning data as a column vector; and
- forming a matrix (m×n matrix, where m is the number of learning data and n is the number of the neurons in said hidden layer) by arranging as many of said column vectors as the number of said learning data.

14. A device of constructing a neural network comprising an input layer having at least one neuron into which input values are inputted, an output layer having at least one neuron from which an output value is outputted, and at least one hidden layer having at least one neuron provided between said input layer and said output layer, each neuron in each layer being linked to every neuron of a next layer from said input layer to said output layer side, said device determining the number of said neurons in said hidden layer;

said device comprising:
- link weight determining means for inputting a plurality of teacher signals as learning data into said input layer and determining link weights between each pair of linked neurons; and rank calculating means for calculating a rank value of a matrix O expressed by the following linear equation:

$$O \times w = t$$

wherein w stands for a column vector of said link weights and t stands for a column vector of said teacher signals, and taking said rank value as the number of the neurons in said hidden layer.

\* \* \* \* \*